United States Patent [19]

Granzotti

[11] 3,758,717

[45] Sept. 11, 1973

[54] FREE HAND DRAWING DISPLAY SYSTEM UTILIZING LIGHT PEN TO WRITE AND ERASE INFORMATION

[75] Inventor: Angelo N. Granzotti, Washington, D.C.

[73] Assignee: International Business Machines Corporation, Armonk, N.Y.

[22] Filed: May 28, 1970

[21] Appl. No.: 41,405

[52] U.S. Cl. ........... 178/6.8, 250/217 CR, 250/227, 340/324 A

[51] Int. Cl. ............ H04n 7/18

[58] Field of Search ............ 178/6.8, DIG. 12; 250/217 CR, 227; 340/324 A

[56] References Cited

UNITED STATES PATENTS

| | | | |
|---|---|---|---|
| 3,345,459 | 10/1967 | Dudley | 250/217 CR |
| 3,497,701 | 2/1970 | Dalton | 250/217 CR |
| 3,509,350 | 4/1970 | Gundrum | 340/324.1 |
| 3,195,405 | 7/1965 | Clark | 250/227 |
| 3,356,854 | 12/1967 | Humphrey | 250/227 |
| 2,717,920 | 9/1953 | Avins | 178/Dig. 12 |
| 2,855,589 | 10/1958 | Baker | 250/217 CR |

OTHER PUBLICATIONS

Randa–CRT Display With Pen Tracking– IBM Tech. Disclosure Bulletin – Vol. 5 – No. 2 – 1962 – pp. 40–42.

*Primary Examiner*—Robert L. Griffin
*Assistant Examiner*—Joseph A. Orsino, Jr.
*Attorney*—Hanifin and Jancin and George E. Clark

[57] ABSTRACT

A display system including a light pen adapted to write or erase either a narrow or a wide path on a CRT display device, allows an operator to draw or erase with a free hand motion by inverting the polarity of the displayed image so that non-information raster areas are bright spots and information areas are dark spots on the face of the display screen. More specifically, an image inverter is added between the image refresh memory device and the display device to free the operator from restraint due to the inherent ability of a light sensitive device to only operate on bright spots on a display screen.

5 Claims, 6 Drawing Figures

INVENTOR
ANGELO N. GRANZOTTI

BY J. E. Clark

AGENT

FREE HAND DRAWING DISPLAY SYSTEM UTILIZING LIGHT PEN TO WRITE AND ERASE INFORMATION

BACKGROUND OF THE INVENTION

The present invention relates to electronic writing systems and more particularly, to a system for writing or erasing information on a display screen in an unconstrained manner.

Presently available displays are normally equiped either with light pens or joystick controls to provide means for entering limited amounts of information regarding the coordinates of a point on the display screen. Joysticks are awkward to use and restrict the operator to entering only the coordinates of one point at a time.

Light pens, although easier to use, are also restricted to entering the coordinates of only the single point at which light is detected.

Although light pens are easier to use than joysticks, neither offers both an accurate method of pinpointing a position in the screen and the ability to draw, freehand, continuous curves, symbols or any unconstrained shape within the capability of the operator without extensive program support packages.

In view of the disadvantages of the prior art electronic writing systems, it is, therefore, an object of the present invention to generate unconstrained, free hand written information.

It is a further object of the instant invention to write information on a display screen using a light pen having a choice of a wide or narrow stroke.

Another object of the present invention is to erase information from a display screen using a light pen having a choice of either a wide or narrow stroke.

Yet another object of the present invention is to allow an operator the freedom to write or erase information on a display device with the same freedom the operator would have using pencil and paper.

A still further object of the present invention is to generate hand-written data from a display screen without the aid of special programming routines.

SUMMARY OF THE INVENTION

In accordance with the present invention, means in the form of a multiple width light pen, including an erase/write switch is connected to the video generation circuitry of a raster scanned display system to enable an operator to draw in a free-hand manner with a minimum of restraint. A normal/invert switch is connected to means for inverting the polarity of the video signal transmitted to the display device to permit light pen detection of non-data areas represented by illuminated phosphor during the write or erase operation and to permit longer CRT life in the invert position by having the illuminated phosphor represent data against a dark background.

The foregoing and other objects, features and advantages of the invention will be apparent from the following more particular description of a preferred embodiment of the invention, as illustrated in the accompanying drawings.

DETAILED DESCRIPTION OF THE INVENTION

Figure 1:
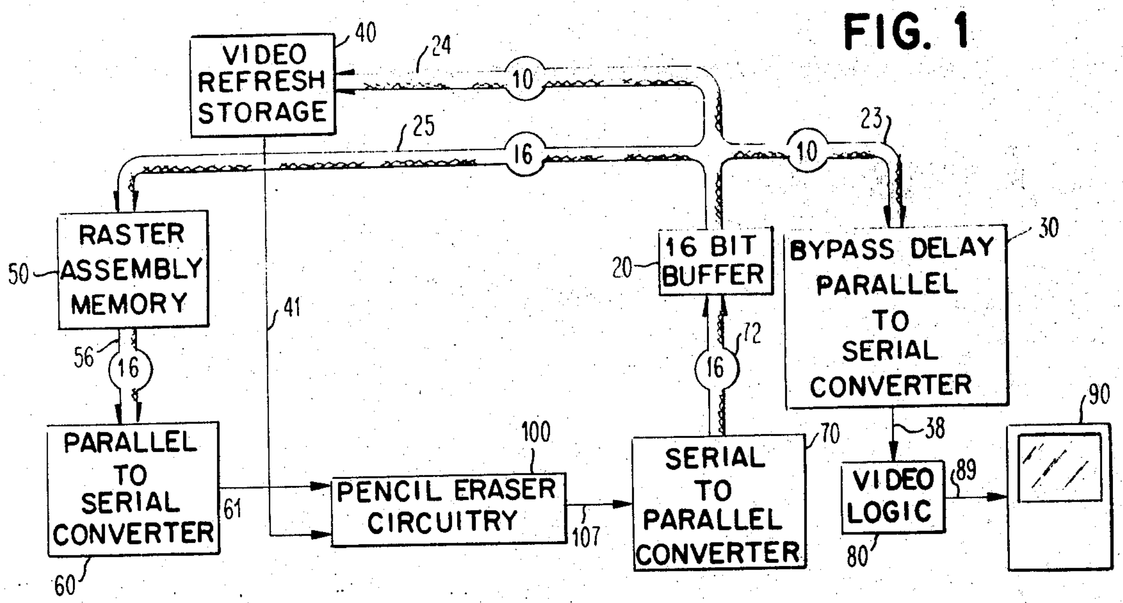
FIG. 1 is a block diagram of a display control system embodying the instant invention.

Referring now to FIG. 1, a portion of a digital data display system is shown in which information to be displayed is transmitted from a central data source (not shown) to raster assembly memory 50 where the information is placed in the proper format for transmission to a display terminal. Pages of data to be displayed are transmitted from raster assembly memory 50 to parallel-to-serial converter 60 in parallel by lines 56.

Parallel-to-serial converter 60 converts the parallel data from the memory into serial so that it may be integrated into the video stream to be transmitted to a display terminal.

The serial data is then transmitted to pencil/eraser circuitry 100 along line 61. The pencil/eraser circuitry 100 is connected by line 107 to serial-to-parallel converter 70 which converts the serial information to parallel form so that it may be buffered and transmitted either to a video refresh storage 40 or to by-pass delay and parallel-to-serial converter 30 which reconverts the parallel data to serial form for transmission to the display terminal.

The parallel data from serial-to-parallel converter 70 is transmitted along line 72 to buffer 20 which distributes outputs along lines 23 to by-pass delay and parallel-to-serial converter 30, along lines 24 to video refresh storage 40, and along lines 25 to raster assembly memory 50.

The by-pass delay and parallel-to-serial converter 30 transmits a serial data stream along line 38 to a video logic 80 which generates a composite video signal to be transmitted along line 89 to display terminal 90.

Video refresh storage 40 which is used to repaint the information on the display terminal for repetitive frames of information has an output connected along line 41 to pencil/eraser circuitry 100.

Figure 2:
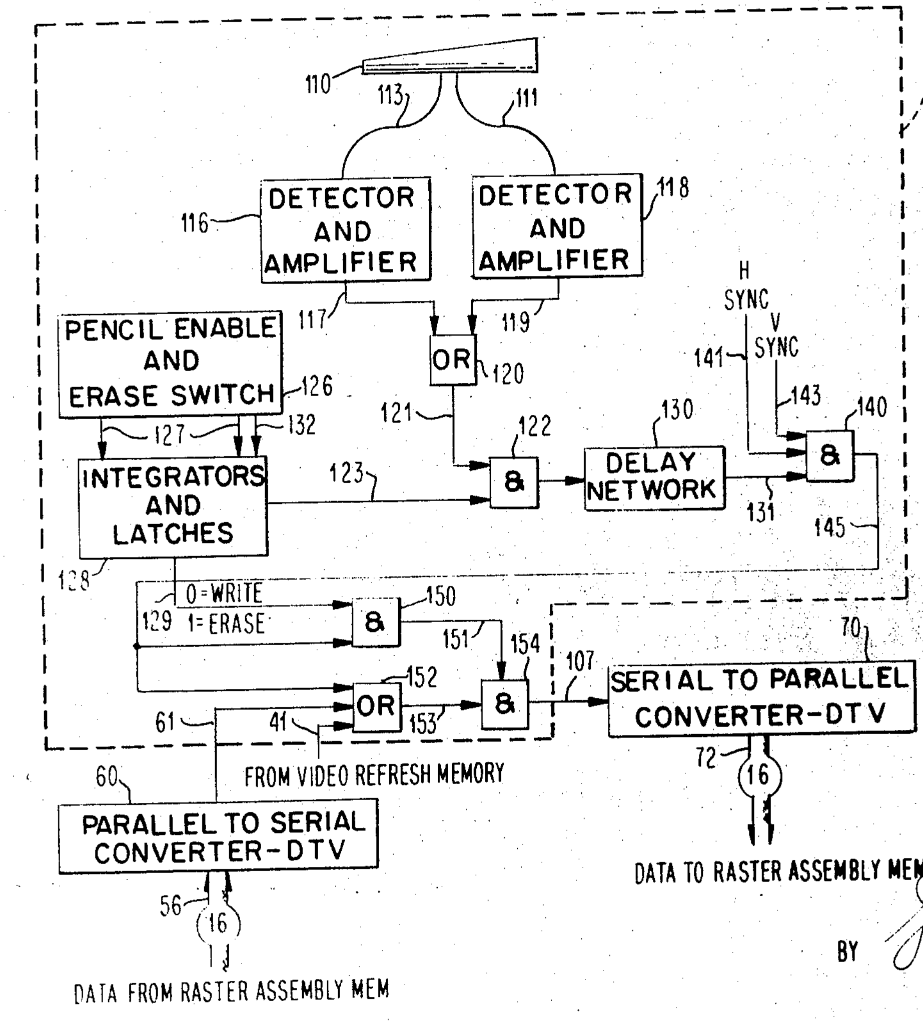
FIG. 2 is a more detailed logic diagram of the pencil/-eraser circuitry embodying the instant invention.

Referring now to FIG. 2, pencil/eraser circuitry 100 is shown in greater detail.

Figure 4:
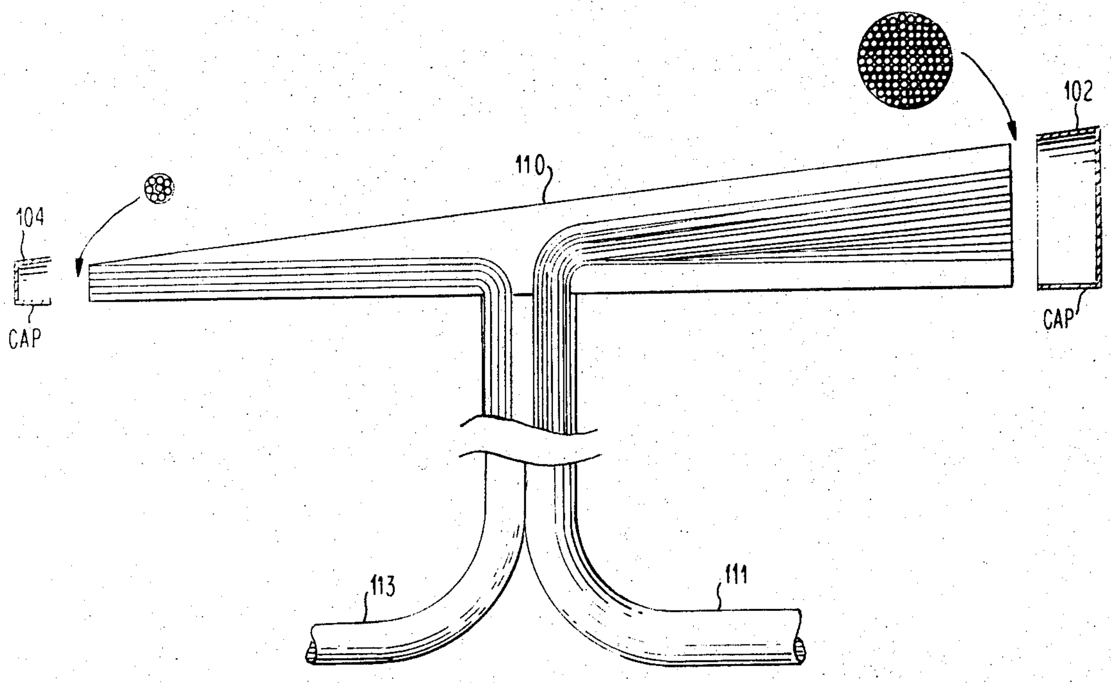
FIG. 4 is a section view of a fibre optics light pen which has the capability of writing or erasing either small width lines with a first fibre optics bundle or large width lines with a second fibre optics bundle.

Light pencil 110 which is shown in section view in FIG. 4, has a small aperture and a large aperture which are adapted to transmit light along fibre optic bundles 113 and 111 respectively. In FIG. 4 end cap 102 is shown for sealing the large aperture of light pen 110 when a narrow width line is being written or erased by the small aperture end. Conversely, when a wide line is being written or erased, cap 104 is placed over the smaller aperture end of light pencil 110 and cap 102 is removed, allowing light to be transmitted along fibre optics bundle 111.

Referring again to FIG. 2, fibre optics bundle 113 transmits light from the small aperture end of light pen 110 to light detector and amplifier 116 when a narrow line is being written or erased. Light is transmitted along fibre optics path 111 to light detector and amplifier 118 when a wide line is being written or erased. Since only one end of the light pen will be used at any one time, the outputs 117 from light detector and amplifier 116 and 119 from light detector and amplifier 118 are connected to OR circuit 120. The output 121 of OR circuit 120 is connected to one input of AND circuit 122. A second input 123 of AND circuit 122 is generated by pencil enable and erase switch 126 which is connected to integrators and latches 128 by lines 127. The output 123 of integrators and latches 128 is established such that when the pencil enable and erase switch is in the write position, the output 129 is a "zero" or an inactive level and output 123 is a "one" or an active level while when the pencil enable and erase switch 126 is in the erase position, the outputs 123 and 129 are a "one" or an active level. When pencil enable and erase switch 126 is in the center off position, output 123 is a "zero" or inactive level and output 129 remains at its previous level.

Therefore, when the pencil enable and erase switch is in the erase position and a light pen detect is made, AND circuit 122 produces an output to delay network 130. The time delay of delay network 130 is set to compensate for delays in the detection and amplifying and logic circuitry so that the location on the screen of the light pen detect is correctly identified. Horizontal sync is connected to AND circuit 140 by line 141 and vertical sync is connected to AND circuit 140 at a second input by line 143. The output 131 of delay network 130 which is connected to a third input of AND circuit 140. The output 145 of AND circuit 140 is connected to a first input of AND circuit 150 and a first input of OR circuit 152. A second input of AND circuit 150 is output 129 of integrators and latches 128. Thus, when the pencil enable/erase switch is in the erase position, the vertical and horizonal synchronization signals representing a location of the display screen where a light pen detect has been made are transmitted on line 151 to a first input of AND circuit 154. A second input of AND circuit 154 is connected to an output 153 of OR circuit 152. The inputs to OR circuits 152 are: first, line 145 which is the output of AND circuit 140; second, line 61 which is the serial output of parallel-to-serial converter 60; and third, line 41 which is the serial output of video refresh storage 40. The output 107 of AND circuit 154 represents the serial output of the pencil/eraser circuitry 100 and is connected to the input of serial-to-parallel converter 70.

Figure 5:
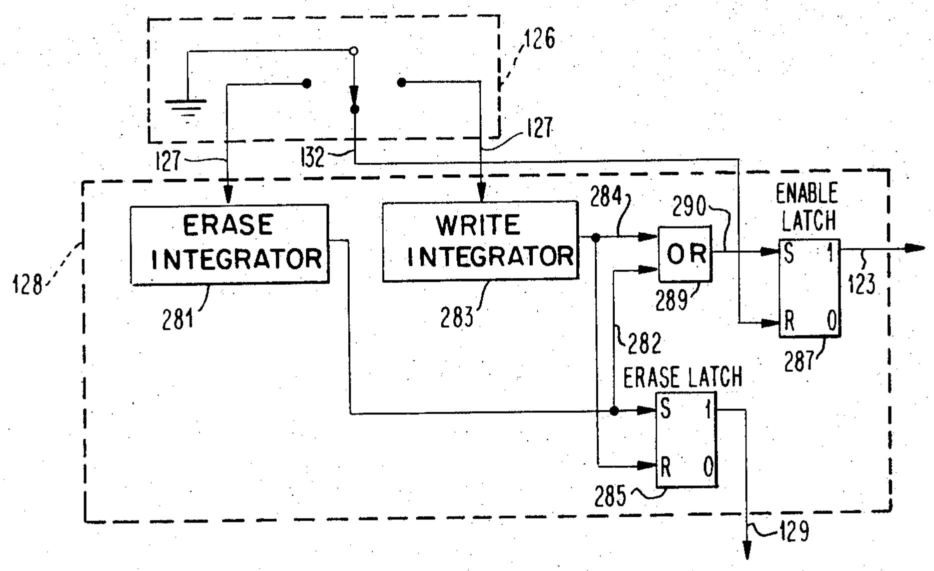
FIG. 5 is a logic diagram which shows in further detail the pencil enable and erase switch and the associated integrators and latches.

Referring now to FIG. 5, the pencil enable and erase switch 126 and the integrators and latches 128 are shown in further detail. The outputs 127 from the pencil enable and erase switch 126 are connected to erase integrator 281 and write integrator 283 respectively. The output 282 of the erase integrator 281 is connected to an input of OR 289 and to set input of ERASE latch 285. The output 284 of write integrator 283 is connected to the reset input of latch 285 and to a second input of OR 289. The output 290 of OR 289 is connected to the SET input of ENABLE latch 287. The center off pole 132 of switch 126 is connected to the RESET input of ENABLE latch 287 to disable AND 122 when the light pen is not being used to write or erase. The output of latch 285 appears on line 129 which is connected to an input of AND circuit 150 while the output of ENABLE latch 287 appears on line 123 which is connected to an input of AND circuit 122.

Figure 3:
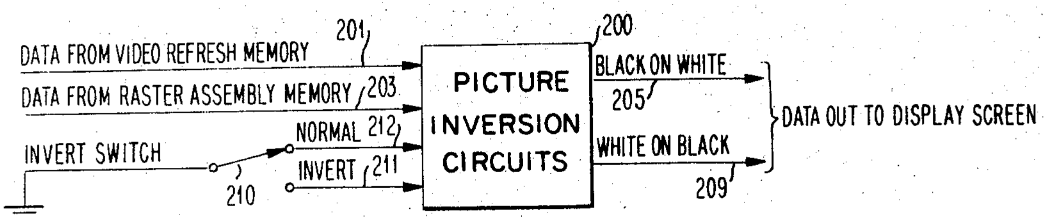
FIG. 3 is a block diagram showing the operation of the normal/invert video polarity switch.
Figure 6:
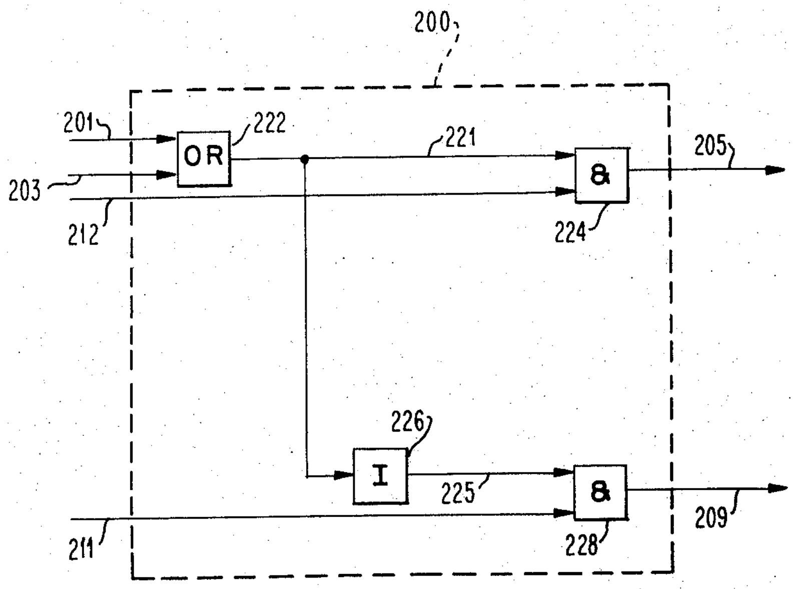
FIG. 6 is a logic diagram which shows in further detail the picture inversion circuits.

Referring now to FIGS. 1, 3 and 6, the video logic block 80 contains within it picture inversion circuits 200 as shown in FIG. 3 which is described in greater detail in FIG. 6.

For the operator to have a free-hand drawing or erasing capability on the display screen, the normal polarity of the data will be black or blanked dots on an all white or brightened phosphor while the inverted polarity for normal viewing and for extended CRT life will be illuminated dots on a dark background.

To achieve this function, data from the video refresh storage on line 201 and data from the raster assembly storage on line 203 are connected to first and second inputs of OR circuit 222 which presents the data from one of the two mentioned storages on output 221 which is connected to an input of inverter 226 and a first input of AND circuit 224. The NORMAL active level of switch 210 is connected to a second input of AND circuit 224 by line 212 while the INVERT active level of switch 210 is connected to an input of AND circuit 228 by line 211. The output of inverter 226 is connected to an input of AND circuit 228 by line 225.

The circuit arrangement shown in FIG. 6 enables a black on white picture representation to appear on line 205 when the switch 210 is in the normal position and a white on black data representation to appear on line 209 when the switch 210 is in the invert position.

The embodiment described is a portion of a system for converting digital data from a data source to video data capable of being combined with horizontal and vertical synchronizing signals for presentation on a standard TV type display device.

It is to be understood that the embodiment shown is but one embodiment employing the instant invention and various changes in form and detail may be made without departing from the spirit and scope of the invention.

WRITE OPERATION

When an operator wishes to write or draw in a free-hand mode on a surface of a display device and enter the information to a computer, he takes a light pen, such as light pen 110, and removes end cap 102 or 104 depending upon whether he wishes to draw with a wide or narrow stroke, places switch 210 in the NORMAL position to achieve a black on white data presentation and then begins to draw or write in an unconstrained manner.

Referring now to FIGS. 1 and 2, the operator places the uncapped end of light pen 110 against the face of display device 90 which has data presented as blanked or dark spots on a bright background and places switch 126, shown in FIG. 5, in the write position and begins to draw or write information on the display device with the apparatus performing in the following manner.

The computer output data stored in raster assembly member 50 is initially transferred by lines 56 to parallel-to-serial converter 60 which converts this information to serial data which is transmitted to pencil eraser circuitry 100 in which the light pen write/erase signals are combined with the raster information.

Referring now to FIG. 2, with pen ENABLE and ERASE switch 126 in the write position, it is desired to enter blanked spots into the raster video stream for any point to be written on the display device since the data appears as dark spots on a bright screen.

Therefore, light detected by light pen 110 is transmitted to detector and amplifier 116 or detector and amplifier 118 by fiber-optics paths 113 or 111, respectively. The outputs 117 and 119 of the detector and amplifiers 116, 118 are combined in OR circuit 120 which has output 121 connected as one input to AND circuit 122. Referring now to FIG. 5, when switch 126 is in either the write or the erase position, OR circuit 289 sets ENABLE latch 287 which causes line 123 to be active thereby enabling the light detect information on line 121 to be transmitted to delay network 130. After an appropriate delay to align the light detect information with the proper location in the next frame of the raster, the light detect signal appears at an input 131 of AND circuit 140 where it is combined with horizontal synchronization signals on line 141 and vertical synchronization signals on line 143. The output 145 of AND 140 which represents the position in a raster of a location to be operated on is connected to inputs of AND circuit 150 and OR circuit 152. OR circuit 152 has as other inputs, line 61, which is the serialized data from raster assembly storage, and line 41, which is the serial raster information from video refresh storage. The ORed output 153 appears as one input to AND circuit 154 with a second input to AND 154 being line 151 the output of AND 150. With the pencil enable and erase switch in the write position, AND circuit 150 is inactive causing AND circuit 154 to be enabled allowing the output of OR circuit 152 to be transmitted by line 107 to serial-to-parallel converter 70. The parallel output 72 of serial-to-parallel converter 70 is buffered by 16-bit buffer 20 which transmits a parallel output signal to bypass delay and parallel-to-serial converter 30 along line 23 for video generation in video logic 80 and presentation on display device 90; to video refresh storage 40 along lines 24 for repainting of successive frames of video; and to raster assembly member 50 along lines 25 for storage.

Referring now to FIGS. 1, 3 and 6, the operation of the picture inversion circuits 200 will be described.

The video logic 80 among other functions performs the inversion function which is shown in FIGS. 3 and 6 in more detail.

Data from the video refresh storage on line 201 or data from raster assembly member on line 203 is presented to OR circuit 222. Only one of the lines 201 or 203 will be active during any field of the raster. The output of OR circuit 222 is connected to a first input of AND 224 with the NORMAL line 212 of NORMAL-/INVERT switch 210 being connected to a second input so that the output 205 of AND circuit 224 presents black on white information with the NORMAL-/INVERT switch in the NORMAL position.

The output of OR 222 is also inverted by inverter 226, the output of which is connected to a first input of AND 228. A second input of AND 228 is the INVERT line 211 from NORMAL/INVERT switch 210. The output 209 of AND circuit 228 presents the inverted video signal of bright information on a dark background.

When the operator is performing a free-hand write on the display screen, the NORMAL/INVERT switch should be in the NORMAL position so that the background will be bright dots which are capable of activating the light pen sensor.

ERASE OPERATION

To erase information from the display screen, the operator must place PEN ENABLE and ERASE switch in the ERASE position and place NORMAL/INVERT switch 210 in the INVERT position so that the information content will appear as bright spots capable of being detected by the light pen.

The operator places either end of light pen 110 against the point on the display screen to be erased. The bright spot is detected and a signal is presented to the first input 121 of AND circuit 122. Line 123, the PEN ENABLE line, is active thereby allowing an output to be transmitted to delay network 130. Delay network 130 functions in the same manner as for the write operation. AND circuit 140 also performs the same function for the erase operation as it does for the write operation, presenting a signal on line 145 representative of the location on the screen where a light pen detect has occurred.

With the PEN ENABLE and ERASE switch in the ERASE position, line 129 is active, presenting an active input to AND circuit 150. When line 145 is active, indicating a light pen detect, output 151 of AND circuit 150 presents an inhibit signal to the first input of AND circuit 154.

Thus, when a light pen detect is made at a point on the display screen to be erased, a zero is inserted into the video data stream at that location by the operation of AND circuits 150 and 154.

As the scan of the display screen moves past the point at which the light pen is positioned, no light pen detect signal is present and the input 145 to AND circuit 150 becomes inactive, thereby enabling AND circuit 154 to pass data from OR circuit 152 from either the video refresh memory or the raster assembly memory.

When the erase is completed, PEN ENABLE and ERASE switch 126 (FIG.5) is returned to the off or disable position, thereby rendering line 123 and hence, AND circuit 122 inactive. This prevents any further insertion of light pen information into the video stream.

When the operator has completed his free-hand drawing or erase operation, NORMAL/INVERT switch 210 may be placed in the INVERT position to allow data presentation as white spots on a black background.

While the invention has been particularly shown and described with reference to a preferred embodiment thereof, it will be understood by those skilled in the art that various changes in form and detail may be made therein without departing from the spirit and scope of the invention.

What is claimed is:

1. Apparatus for unconstrained freehand writing or erasing of information on a display device, comprising
   - a digital television electronic display means for displaying information;
   - a light pen for writing or erasing information on said display means;
   - means for inverting the entire information displayed on said display means during an erase operation to enable said light pen to erase undesirable information from said display means.

2. Apparatus according to claim 1 wherein said means for inverting the polarity of information to be displayed on said display means comprises switch means connected to said display means operating to cause information to be displayed as blanked information on a lighted background during a write operation and as lighted information on a blanked background during an erase operation.

3. A light sensitive pen for use in a writing and erasing system according to claim 2, comprising:

a frame having a plurality of apertures therein;

a plurality of light sensitive detectors corresponding to said plurality of said apertures wherein each of said light sensitive detectors is an independent fiber optics bundle for detecting separately;

means for transmitting light detected at said apertures to said detecting means;

a plurality of light tight cap means for covering said plurality of apertures, wherein each of said apertures is a different size.

4. Apparatus for unconstrained writing or erasing of information on a display device, comprising:

electronic display means for displaying information;

a light pen for writing or erasing information on said display means;

means for switching between write operation and erase operation connected to said light pen;

means for inverting the entire information displayed on said display means during an erase operation connected to said means for switching, to enable said light pen to erase undesired information from said display means.

5. A method for unconstrained writing or erasing of information on a display device, consisting of the steps of:

writing information with a light pen on a display means;

displaying said information on said display means;

inverting the entire information displayed on said display means during an erase operation so that said information will appear as bright spots capable of being detected by said light pen on said display means;

erasing undesired information from said displaying means.

* * * * *